United States Patent
Adur et al.

Patent Number: 5,942,295
Date of Patent: Aug. 24, 1999

[54] POLYESTER PAPERBOARD OVENABLE CONTAINER

[75] Inventors: Ashok M. Adur, Ramsey, N.J.; Thomas Z. Fu, Croton; Jongsoo Lee, Pittsford, both of N.Y.

[73] Assignee: International Paper Co., Tuxedo Park, N.Y.

[21] Appl. No.: 08/942,545

[22] Filed: Oct. 1, 1997

[51] Int. Cl.$^6$ .................................................. B32B 27/00
[52] U.S. Cl. ........................ 428/34.2; 428/483; 428/532
[58] Field of Search ...................... 428/483, 532, 428/34.2; 252/299.01

[56] References Cited

U.S. PATENT DOCUMENTS

| | | |
|---|---|---|
| 32,270 | 10/1861 | Murray, Jr. . |
| 3,904,104 | 9/1975 | Kane . |
| 3,939,025 | 2/1976 | Kane . |
| 3,967,998 | 7/1976 | Kane . |
| 4,387,126 | 6/1983 | Rebholz . |
| 4,391,833 | 7/1983 | Self et al. . |
| 4,573,832 | 3/1986 | Zinner . |
| 4,595,611 | 6/1986 | Quick et al. . |
| 4,692,487 | 9/1987 | Son et al. ................................. 524/100 |
| 4,698,246 | 10/1987 | Gibbons et al. . |
| 4,765,999 | 8/1988 | Winter . |
| 4,806,398 | 2/1989 | Martin, Jr. . |
| 4,900,594 | 2/1990 | Quick et al. . |
| 5,246,773 | 9/1993 | Mamish ................................. 428/286 |
| 5,637,773 | 6/1997 | Davis et al. ............................ 428/35.8 |

*Primary Examiner*—Charles Nold
*Attorney, Agent, or Firm*—Hoffman, Wasson, & Gitler; Michael J. Doyle, Esq.

[57] ABSTRACT

A laminate structure for containers produced using product contact materials including polyethylene isophthalate, poly (1,4-cyclohexanyl dimethylene terephthalate) and blends thereof. The unique paperboard structure provides cost savings and high temperature end-use performance required in dual-ovenable containers.

14 Claims, 1 Drawing Sheet

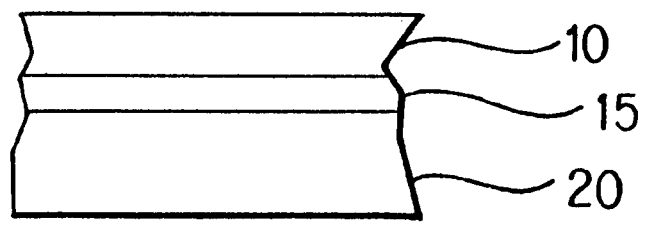
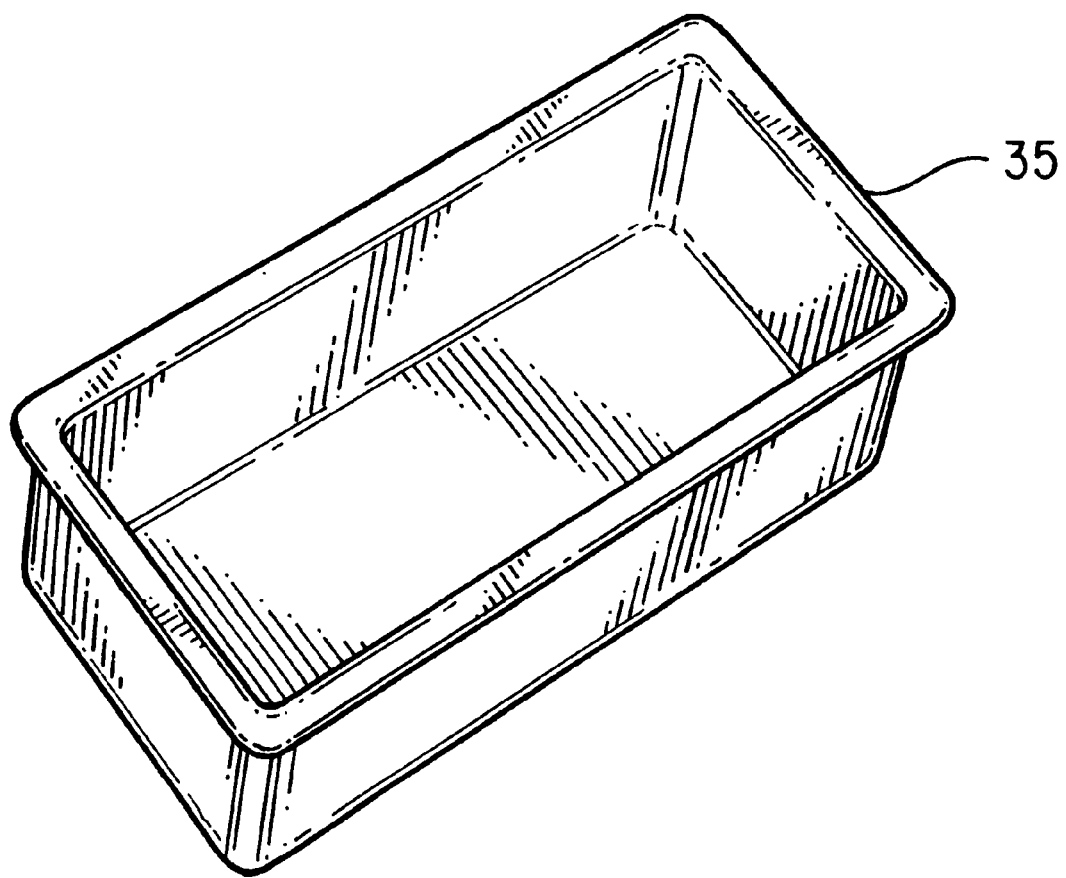

POLYESTER PAPERBOARD OVENABLE CONTAINER

BACKGROUND OF THE INVENTION

The invention addresses a polymer coated paperboard which can be utilized for dual ovenable applications. The polymer coating contains a layer of a polyester prepared from at least one of the following monomers: propylene glycol, 1,4-cyclohexanyl dimethylene diol or isophthalic acid. These include poly(1,4-cyclohexanyl dimethylene terephthalate (PCT) or polyethylene isophthalate (PEIT).

In the past, dual ovenable containers have been constructed from a laminate containing paperboard, a tie layer of ethylene-methyl acrylate (EMA), ethylene-vinyl acetate copolymers, acrylic acid copolymers, physical blends of polyethylene with about 20% polyethylene terephthalate (PET) or physical blends of ethylene-methyl acrylate with polyethylene terephthalate. See U.S. Pat. No. 4,455,184.

The polyesters of the present invention are neither discussed nor suggested by the '184 patent. These polyesters have much higher melting points, typically above 250° C. and are more stable than polyethylene terephthalate. This allows the container produced to exhibit superior cooking performance. The superior materials and resultant structures allow for coating weights of the polyester to be below 25 lbs/3,000 sq. ft., something not previously practical with polyethylene terephthalate. Weights below 25 lbs/3,000 sq. ft. of polyethylene terephthalate exhibited poor adhesion to the paperboard substrate, in addition to deleterious pinholes formed therein. Reduction of the coating weights of the product contact layer provided significant economic savings in production of the structure.

It is an object of the present invention to produce a coating for contact with a product in a dual ovenable container that is less costly than polyethylene terephthalate and maintains product quality.

It is a further object of the present invention that reduces coating neck-in during extrusion coating and therefor high trimming and waste.

It is yet a further object of the present invention to increase adhesion of the product contact layer coating to paperboard.

Another object of the present invention is to increase flexibility of the coating structure.

Another object of the present invention is to increase coating line speed without causing detrimental effect on the quality of products being produced.

Yet another object of the present invention is the production of high temperature cooking coated paper containers.

SUMMARY OF THE INVENTION

The invention covers structures of coated paperboard for packaging applications and methods of producing and using them. The structure is made from a laminate having a paperboard substrate, an adhesive tie layer and an unique polyester layer selected from poly(1,4-cyclohexanyl dimethylene terephthalate), polyethylene isophthalate or blends thereof.

BRIEF DESCRIPTION OF THE DRAWINGS

FIG. 1 is a cross-section of a laminate embodying the present invention; and

FIG. 2 is a perspective view of one type of container formed from the laminate of the present invention.

DETAILED DESCRIPTION OF THE PREFERRED EMBODIMENTS

The inventive structure is depicted in cross-section in FIG. 1. A product contact coating 10 of a material selected from poly(1,4-cyclohexanyl dimethylene terephthalate), polyethylene isophthalate or mixtures thereof is extruded onto or coextruded with an adhesive tie layer 15 of a paperboard substrate 20. The product contact layer has a coating weight ranging from 4–35 lbs/3,000 sq. ft., although it is preferred to have a coating weight of 10–12 lbs/3,000 sq. ft. The extruded or coextruded tie layer has a coating weight ranging from 1–30 lbs/3,000 sq. ft. with a preferred weight range being from 3–6 lbs/3,000 sq. ft. If desired, prior to extrusion the paperboard surface is treated by on-line flame treatment or corona treatment to enhance tie layer adhesion to board.

The extrudable tie layer can be selected from: ethylene-methyl acrylate copolymers; ethylene-ethyl acrylate copolymers, ethylene-butyl acrylate copolymers, ethylene-ethyl acrylate-maleic anhydride terpolymers, or ethylene-butyl acrylate-maleic anhydride terpolymers.

Additionally, the tie layer can include or be filled with from 0–60 wt % inorganic fillers, preferably from 15–30 wt %. Representative of fillers are calcium carbonate, clay, titanium dioxide and silica. The fillers enhance the stiffness and heat stability of the tie layer and thereby the entire bilayer layer coating structure.

The tie layer may also contain an antioxidant additive, preferably a hindered phenol such as 3,5-bis(1,1-Dimethylethyl)-4-hydroxybenzenepropanoic acid, 2,2-bis [[3-[3,5-bis(1,1-dimethylethyl)-4-hydroxyphenyl]-1-oxopropoxy]methyl]1,3-propanediyl ester sold under the trade name Irganox 1010 made by Ciba-Geigy, with a concentration ranging from 0.05%–2.0% of the tie layer.

The coated board can be converted into many different types of packaging containers such as dual ovenable trays, eat-in-boxes, and gable-top cartons.

It is further possible, if desired, to coat the uncoated exterior of the paperboard substrate with suitable thermoplastic polymers. Such can be followed with printing onto the structure.

The basis weight of the paperboard can vary from 80 lbs/3,000 sq. ft. to 380 lbs/3,000 sq. ft., with a preference of (140–280 lbs)/3,000 sq. ft.

Applying both tie layer and product contact layer to the substrate can be achieved by either coextrusion coating both layers onto paper or lamination of biaxially oriented product contact layer in a film onto paper using a tie layer by standard lamination or extrusion lamination processes.

The use of new and unique higher melting materials such as poly (1,4-cyclohexanyl dimethylene terephthalate), polyethylene isophthalate, and their blends, as the product contact layer (top layer) and tie resins with or without antioxidants and fillers as heat stability and strength additives provide a significant advance over the existing polyethylene terephthalate structures achieving the necessary high temperature end-use performance and cost savings required.

It is understood that the invention is not confined to the particular embodiments described herein, but embraces all modified forms thereof which come within the scope of the claims.

We claim:

1. A dual ovenable laminate structure comprising:
   a) a paperboard substrate;
   b) an extrudable tie layer selected from the group consisting of ethylene-methyl acrylate copolymer, ethylene-ethyl acrylate copolymer, ethylene-butyl acrylate copolymer, ethylene-ethyl acrylate-maleic anhydride terpolymer, and ethylene-butyl acrylate-maleic anhydride terpolymer; and c) a product contact layer selected from the group consisting of poly(1,4-cyclohexanyl dimethylene terephthalate), polyethylene isophthalate and blends thereof.

2. A laminate structure as claimed in claim 1, wherein said extrudable tie layer has incorporated therein an inorganic filler in an amount up to 60% of said layer to enhance stiffness and heat stability of said layer.

3. A laminate structure as claimed in claim 1, wherein said extrudable tie layer further includes an antioxidant in a concentration ranging from 0.05–2.0%.

4. A laminate structure as claimed in claim 3, wherein said antioxidant is a hindered phenol compound.

5. A laminate structure as claimed in claim 4, wherein said hindered phenol compound is 3,5-bis(1,1-Dimethylethyl)-4-hydroxybenzenepropanoic acid, 2,2-bis[[3-[3,5-bis(1,1-dimethyl-ethyl) -4-hydroxyphenyl]-1-oxopropoxy]methyl] 1,3-propanediyl ester.

6. A laminate structure as claimed in claim 1, wherein said tie layer has a coating weight of from 1–30 lbs/3,000 sq. ft.

7. A laminate structure as claimed in claim 1, wherein said product contact layer has a coating weight of from 4–35 lbs/3,000 sq. ft.

8. A dual ovenable container constructed from a laminate structure comprising:

a) a paperboard substrate;

b) an extrudable tie layer selected from the group consisting of ethylene-methyl acrylate copolymer, ethylene-ethyl acrylate copolymer, ethylene-butyl acrylate copolymer, ethylene-ethyl acrylate-maleic anhydride terpolymer, and ethylene-butyl acrylate-maleic anhydride terpolymer; and c) a product contact layer selected from the group consisting of poly(1,4-cyclohexanyl dimethylene terephthalate), polyethylene isophthalate and blends thereof.

9. A container constructed from a laminate structure as claimed in claim 8, wherein said extrudable tie layer has incorporated therein an inorganic filler in an amount up to 60% of said layer to enhance stiffness and heat stability of said layer.

10. A container constructed from a laminate structure as claimed in claim 8, wherein said extrudable tie layer further includes an antioxidant in a concentration ranging from 0.05–2.0%.

11. A container constructed from a laminate structure as claimed in claim 10, wherein said antioxidant is a hindered phenol compound.

12. A container constructed from a laminate structure as claimed in claim 11, wherein said hindered phenol is 3,5-bis(1,1-Dimethylethyl)-4-hydroxybenzenepropanoic acid, 2,2-bis[[3-[3,5-bis(1,1-dimethylethyl) -4-hydroxyphenyl]-1-oxopropoxy]methyl]1,3-propanediyl ester.

13. A container constructed from a laminate structure as claimed in claim 8, wherein said tie layer has a coating weight of from 1–30 lbs/3,000 sq. ft.

14. A container constructed from a laminate structure as claimed in claim 8, wherein said product contact layer has a coating weight of from 4–35 lbs/3,000 sq. ft.

* * * * *